US011271431B2

(12) United States Patent
Murray et al.

(10) Patent No.: US 11,271,431 B2
(45) Date of Patent: Mar. 8, 2022

(54) SYSTEM FOR MANAGING WIRELESS INDUCTIVE CHARGING OF MOBILE ELECTRONIC DEVICES WITHIN THE INTERIOR OF A VEHICLE HAVING ENGINE STOP-START CAPABILITY AND MAT FOR USE THEREIN

(71) Applicant: JVIS-USA, LLC, Sterling Heights, MI (US)

(72) Inventors: Shawn P. Murray, Oxford, MI (US); Darius J. Preisler, Macomb, MI (US)

(73) Assignee: JVIS-USA, LLC, Shelby Township, MI (US)

( * ) Notice: Subject to any disclaimer, the term of this patent is extended or adjusted under 35 U.S.C. 154(b) by 140 days.

(21) Appl. No.: 16/810,915

(22) Filed: Mar. 6, 2020

(65) Prior Publication Data

US 2021/0281109 A1    Sep. 9, 2021

(51) Int. Cl.
  *H01M 10/46* (2006.01)
  *H02J 50/12* (2016.01)
  *H02J 7/00* (2006.01)

(52) U.S. Cl.
  CPC ........... *H02J 50/12* (2016.02); *H02J 7/0044* (2013.01); *H02J 7/0045* (2013.01)

(58) Field of Classification Search
  CPC .......... H02J 50/20; H02J 50/12; H02J 50/005; H02J 7/0045; H02J 7/0044; H02J 7/0042
  USPC ................ 320/104, 107, 108, 109, 114, 115; 307/104
  See application file for complete search history.

(56) References Cited

U.S. PATENT DOCUMENTS

| 7,986,059 | B2 | 7/2011 | Randall |
| 9,181,895 | B2 | 11/2015 | Roberts et al. |
| 9,190,865 | B2 | 11/2015 | Winget et al. |
| 9,191,076 | B2 | 11/2015 | Winget et al. |
| 9,205,753 | B2 | 12/2015 | Winget et al. |
| 9,776,635 | B2 | 10/2017 | Khafagy et al. |
| 2010/0131152 | A1 | 5/2010 | Castonguay et al. |
| 2010/0156197 | A1 | 6/2010 | Randall |
| 2013/0249682 | A1* | 9/2013 | Van Wiemeersch ......... B60L 53/124 340/426.24 |
| 2013/0257147 | A1 | 10/2013 | Murar |
| 2018/0056887 | A1* | 3/2018 | Salter ............. H02J 7/025 |
| 2018/0198313 | A1* | 7/2018 | Lee ............. H04B 5/0037 |
| 2018/0219429 | A1 | 8/2018 | Bareiss et al. |

(Continued)

*Primary Examiner* — Edward Tso
(74) *Attorney, Agent, or Firm* — Brooks Kushman P.C.

(57) ABSTRACT

A system for managing wireless inductive charging of mobile electronic devices within the interior of a vehicle having engine stop-start capability and a mat for use in the system are provided. The system includes a wireless inductive charger including a power transmitter coil configured to transmit power by inductive coupling and having a charging area for charging a mobile electronic device located in the charging area. A detection circuit includes an inductive proximity sensor to detect foreign objects that disturb power transmission in the charging area and to provide a signal indicating detection of a foreign object in the charging area. A vehicle controller includes control logic to command electrical power shut off to the charger based on the signal and to allow the charger to continue to charge the device during a period of time when the engine is temporarily turned off.

27 Claims, 3 Drawing Sheets

(56) References Cited

U.S. PATENT DOCUMENTS

2019/0339926 A1* 11/2019 Wahlberg ................ G06F 3/167

* cited by examiner

SYSTEM FOR MANAGING WIRELESS INDUCTIVE CHARGING OF MOBILE ELECTRONIC DEVICES WITHIN THE INTERIOR OF A VEHICLE HAVING ENGINE STOP-START CAPABILITY AND MAT FOR USE THEREIN

TECHNICAL FIELD

At least one embodiment of the present invention generally relates to the management of wireless inductive charging systems capable of foreign object detection within a vehicle having engine stop-start capability.

OVERVIEW

Wireless charging of portable electronic devices has been known for some time. Examples of such wireless charging are shown in U.S. patent documents U.S. Pat. No. 7,986,059 and 2010/0156197.

Wireless charging of electrical/electronic devices can be done conductively or inductively. Conductive charging requires a physical connection between the electronic device's battery and the power supply. The need for a metal-to-metal connection between the charger and the device requiring charging is one of the main drawbacks of this method. To accomplish this without the use of physical cords connected to wall outlets, special attachments are made from electronic devices which are fitted with a detector that can detect when the device makes connection with the power source, often a charging base. Conduction-based wireless accessories may include changeable backs for cellular phones, special sleeves and attachable clips. The electronic devices, fitted with these accessories, are simply placed on the charging base. The base is able to detect when a compatible device has been placed on it and begin the battery charging process. These charging bases are usually designed to be able to distinguish between human and metal contact so that there is no risk of electrocution.

There are a number of problems affecting the passage of current between contact surfaces such as: surface finish; wear; arc erosion; contamination; oxidation; silicone contamination; frettage and frottage corrosion; and contact bounce.

Many of the above-noted problems result in a reduction in electrical contact area which increases electrical resistance and results in much higher operating temperatures at the contact surfaces causing inefficient operation and damage to the contacts themselves.

An uneven contact surface will wear on the contact areas. Debris from abrasion and erosion will collect in any cavity in the contact areas, oxidize, and further reduce contact surface area and increase abrasion.

An attribute of some of the wire-free conductive power delivery systems includes combinations of power delivery pad configurations and power receiver contact configurations that ensure wire-free power transfer from the power pads to the electronic devices, regardless of the location or orientation at which the mobile electronic device with its power receiver contacts may be positioned on the power delivery pad. For example, for a power delivery pad with an array of square power surfaces, each one being opposite in polarity to each laterally adjacent power surface, a power receiver contact configuration or constellation comprising at least five contacts equally spaced in a circle (pentagon configuration) of appropriate size in relation to the square power surfaces.

In another example, for a power delivery pad with an array of elongated, parallel power surfaces or strips, each one of which is opposite in polarity to each adjacent strip, a power receiver contact configuration or constellation comprising at least four contacts, three of which are at points of an equilateral triangle and the fourth of which is at the center of the equilateral triangle of appropriate size in relation to the elongated rectangular power surfaces, can ensure power transfer, regardless of location or orientation of the constellation of power receiver contacts on the power delivery pad.

A charging pad transfers power wirelessly or wire-free, i.e., without a charging adapter cord, to one or more devices resting on it. In this context, the terms "wireless", "wirelessly", and "wire-free" are used to indicate that charging of the device is achieved without a cord-type electric charging unit or adapter, and is achieved with through electrical conduction through contacts with selective geometry. Wireless in this context can be interfacing contacts as will be explained below. Also, the term "enabled" device is used for convenience to mean an electronic or electrically powered device, for example, cell phone, computer, radio, camera, personal digital assistant, digital recorder and playback device, hearing aid, GPS receiver or transmitter, medical instrument, or just about any other portable or wearable device, that is equipped with charging contacts and associated electronic circuitry to enable the device to be electrically charged by the power pad component.

The top surface of the charging pad may comprise an array of contact strips which are energized with low voltage DC or AC or grounded so that every other strip is at a different voltage, e.g., one set of strips are positive and the strips in-between the positive strips are negative or ground potential, or vice versa.

On the underside of one example enabled device there are a plurality of conduction contact points arranged in a "constellation" configuration or pattern. One example constellation pattern comprises four contacts arranged with three of the contacts defining the vertices of an equilateral triangle and the fourth contact in the middle of the equilateral triangle. This pattern is sometimes referred to as a tetrahedron pattern because the four contacts are positioned as the vertices of a tetrahedron would appear in a top plan view of a tetrahedron.

The contact constellation on the enabled device and the contact strip array on the charging pad form a geometrically complementary pair with the property that electrical power can be transferred from the pad into the device regardless of the position and orientation of each particular device on the pad. The particular number, geometric size, and arrangement of the contacts is not the subject of this invention. Suffice it to say that they can be sized, arranged, and shaped to transfer power from the power delivery surface of the charging pad or part or to an enabled charge receiving device.

With appropriate sizing, no matter where or at which orientation the constellation is set on the pad, at least one positive and one negative contact will be made, thus electrical power can be transferred from the pad to the enabled device. Power can be extracted from the contacts using a rectifier, the output of which is approximately equal to the electrical potential between contract strips or pads of the power delivery surface after allowing for some losses in the rectifier circuit. The rectifier can be a bridge rectifier enabled with diodes (not shown) that also inherently prevents the exposed contacts on the mobile or enabled device from being "live" when they are separated or removed from the charging pad. In other words, the diodes in the rectifier between the contacts on the enabled device and the rechargeable battery or capacitor in the enabled device prevents electric current from flowing from the rechargeable battery or capacitor of the device to the contacts.

In this architecture, the voltage on the power delivery surface of the charging pad is fixed and independent of the devices resting on the pad surface. Each individual device that gets positioned on the charging pad is responsible for conditioning the electric power obtained from the charging pad to power that is appropriate for its own use. This scheme inherently allows for multiple devices of various manufacturers with various power requirements to be charged from the same charging pad.

Inductive charging involves the use of an induction coil which produces an electromagnetic field via a charging station where energy is transferred to an electronic device which is also equipped with a corresponding induction coil. The electronic device receives the energy from the magnetic field and then reconverts it into usable electrical current which charges the device's battery and a second induction coil in the portable device takes power from the electromagnetic field and converts it back into electrical current to charge the battery.

Some of the disadvantages associated with inductive charging are as follows:

Lower efficiency, waste heat—Important disadvantages of inductive charging include its lower efficiency and increased resistive heating in comparison to direct contact. Implementations using lower frequencies or older drive technologies charge more slowly and generate heat within most portable electronics.

More costly—Inductive charging also requires drive electronics and coils in both device and charger as shown in FIG. 2, increasing the complexity and cost of manufacturing.

Slower charging—due to the lower efficiency, devices can take longer to charge when supplied power is equal.

Inconvenience—When a mobile device is connected to a cable, it can be freely moved around and operated while charging. In current implementations of inductive charging the mobile device must be left on a pad, and thus cannot be moved around or easily operated while charging.

Incompatability—There are no de facto standards, potentially leaving a consumer, organization or manufacturer with redundant equipment when a standard emerges.

In August 2009, a consortium of interested companies called the Wireless Power Consortium announced they were nearing completion for a new industry standard for low-power inductive charging called "Qi".

Qi is an open interface standard that defines wireless power transfer using inductive charging over distances of up to 4 cm (1.6 inches), developed by the Wireless Power Consortium. The system uses a charging pad and a compatible device, which is placed on top of the pad, charging via resonant inductive coupling.

Mobile device manufacturers that are working with the standard include Apple, Asus, Google, HTC, Huawei, LG Electronics, Motorola Mobility, Nokia, Samsung, BlackBerry, Xiaomi, and Sony.

First released in 2008, the Qi standard had by 2019 been incorporated into more than 160 smartphones, tablets and other devices. Automobile manufacturers have been adding QI charging as standard or optional features.

Foreign Object Detection (FOD) is a safety mechanism which automatically interrupts power delivery if there is interference caused by a foreign object that causes unexpected losses to wireless power transfer. Transmitter electromagnetic field can be coupled into unintended objects with undesired consequences.

Small metal objects like coins, paper clips, pieces of foils and pharmaceutical wrappers when placed between the transmitter and the mobile device can heat up to over 100° C. in a matter of seconds. U.S. Published Application No. 2018/0219429 discloses apparatus for detection of a foreign body by a charging apparatus of a vehicle.

FOD can be divided into system parameter detection methods, wave-based detection methods, and field-based detection methods. System parameter detection methods are normally used in low-power systems. Wave-based detection methods are suitable for high-power applications. Field-based detection methods work for both high-power and low-power applications.

Field-based detection methods are a popular detection method. A metallic object (i.e. MO) item can affect the magnetic field distribution around the item. Thus, the field-based detection methods via inductive coupling can be employed. A detection coil or coil array is often placed on the top of the transmitter to detect MOs. The inductances and the quality factors of the detection coils change with an adjacent MO. Large MOs are easier to be detected than small MOs. If the dimension of the detection coil is much larger than the MO, the parameter variation of the detection coil would not be significant to distinguish the existence of an MO. Therefore, a detection coil array with a size small enough is normally adopted to detect MOs.

Wireless charging of portable electronic devices in vehicles such as automotive vehicles has the potential to keep one's device fully powered up on the road, with no cords to clutter up the car. Depending on the make and model, wireless charging may even fully integrate one's phone with the car's audio system and touchscreen, allowing voice access to the phone's music and address book or quick access through the dashboard screen.

Wireless charging in automotive vehicles has the potential to be both a convenience and a potential way to reduce driver distraction depending upon how carmakers integrate it into a vehicle. If the charging pad is located in a compartment hidden out of sight, for example, and allows a driver to access their device only through voice controls or larger buttons on the car's touch screen, distraction could be reduced.

Plastic parts such as automotive interior plastic parts must satisfy a wide variety of environmental and safety regulations including the need for such parts to be recyclable. Because of the potentially large volume of automotive vehicles that are produced year after year, automotive interior parts must be produced in a cost-effective fashion without the need for elaborate and costly manufacturing facilities.

There are a number of problems associated with the above-noted prior art especially if the disclosed power pads are to be used in an automotive interior environment. For example, automotive interior parts can experience wide temperature swings, (i.e. −30° to 85° C.) a relatively high service temperature (i.e. 85° C.) and are subject to shock and vibration not normally experienced in a controlled home or office environment. Also, objects supported on generally horizontal support surfaces of automotive interior parts experienced various forces (i.e., acceleration, deceleration and/or centrifugal) which urge the objects to shift, slide or roll on the support surfaces in response to the motion of the vehicle.

The following U.S. patent documents are related to at least one embodiment of the present invention: U.S. Pat. No. 9,190,865; 2013/0257147; U.S. Pat. Nos. 9,191,076; and 9,205,753.

As described in U.S. Pat. No. 9,776,635 (i.e. '635 patent), vehicles typically utilize a single 12V battery topology as a vehicle's power source; however, such systems have limited charge power capability. With the increasing demand of electric power in modern day vehicles, there is an increasing challenge to utilize all possible power sources that generate energy in the vehicle and maximize the use of these generated energy devices or systems. The maximum amount of energy that can be stored in such devices determines how other devices may be used or when energy can be provided to such devices.

Vehicles capable of performing an engine stop-start operation utilize an internal combustion engine that is turned off when the vehicle is at an idle status. This allows these vehicles to reduce emissions and save on fuel economy since the internal combustion engine is not operating during an auto stop period. Once the auto-stop period has ended, the internal combustion engine is re-started utilizing an auto start operation. Many auto stop-start equipped vehicles primarily use a single battery as their power source. Due to the fact that the single battery has limited power, the energy management system must make sure that a sufficient amount of energy is still present in the battery when the internal combustion engine is re-started during a stop-start operation. Other features that may be pertinent to operate during the period when the internal combustion engine is temporarily turned off are electrical load devices, particularly those that require increased energy draw that may deplete the battery to a point where engine re-start is not feasible. Techniques have been used to try to alleviate this issue, such as preventing the operation of high energy consumption devices/systems (e.g. EPAS, climate control) and/or adding a voltage stability source during an auto stop-start or re-cranking operation; however, having certain features not available for use during the engine-off operation may be noticeable to the driver of the vehicle, which may result in customer dissatisfaction or bringing the vehicle in for service calls.

Even for vehicles utilizing a dual battery system, the system may still draw from both batteries (such as an engine re-start operation by a starter motor) thereby depleting both batteries of the energy. Moreover, if a power source drops below a predetermined voltage level, diagnostic trouble codes (DTCs) may be set, thereby issuing a warning light to the driver, or more so, inhibiting further use of the engine stop-start operation which negates the advantage of what vehicles with auto stop-start functionality is intended for, to reduce emissions and increase fuel economy for the driver.

The '635 patent discloses an auto stop-start equipped vehicle power management system includes a primary power source supplying energy to an electrical starter to crank a vehicle engine and a secondary power source coupled in parallel to the primary power source. The secondary power source supplies energy to electric loads during an engine auto stop-start operation. The electrical loads maintain vehicle subsystem functionality during the engine auto stop-start operation. The energy supplied to the electrical loads is current limited during the engine auto stop-start operation. A controllable switch decouples the secondary power source from the primary power source and starter motor during the engine auto stop-start operation. Operating parameters of the electrical loads are monitored during the engine auto stop-start operation. If a respective operating parameter threshold associated with the electrical loads is exceeded during the engine auto stop-start operation, then the vehicle engine is automatically restarted and the controllable switches subsequently closed.

U.S. Patent Document No. 2010/0131152 discloses systems, control methods and related apparatus for engine idling reduction, to decrease operating cost and pollution related to the use of an automotive vehicle, while increasing its autonomy. Integrated are an automotive start-stop device, an increased onboard energy capacity, an electric pump that circulates engine coolant to the heater radiator to extract engine thermal inertia for cabin heating and an engine electric cooling system. The system is designed to reduce fuel consumption and air pollution while maintaining auxiliary systems in function and the cabin temperature at an acceptable level when the engine is stopped. This system may be integrated aboard internal combustion engine vehicles that have important idling periods in normal conditions. Such systems can either be implemented as retrofit kits or during a vehicle's manufacturing, directly by the original equipment manufacturer (OEM).

U.S. Pat. No. 9,181,895 discloses a start-stop retrofit kit including a start-stop module configured to monitor one or more parameters of a vehicle, configured to automatically stop an engine of the vehicle when the vehicle is idling during operation and configured to automatically start the engine when the vehicle is not idling during operation. The retrofit kit further includes a wire harness configured to couple the start-stop module to a switch disposed between a starter motor and an ignition of the engine of the vehicle, wherein the switch is disposed in parallel with an existing connection between the ignition and the starter motor.

SUMMARY OF EXAMPLE EMBODIMENTS

An object of at least one embodiment of the present invention is to provide a system for managing wireless inductive charging within the interior of a vehicle having engine stop-start capability wherein a wide variety of foreign objects are quickly detected to shut off charging power and charging continues during a period of time when the engine is temporarily turned off.

Another object of at least one embodiment of the present invention is to provide a FOD mat which protects a wireless charger.

In carrying out the above objects and other objects of at least one embodiment of the present invention, a system for managing wireless inductive charging of mobile electronic devices within the interior of a vehicle having engine stop/start capability is provided. The system includes a wireless inductive charger including a power transmitter coil configured to transmit power by inductive coupling and having a charging area for charging a mobile electronic device located in the charging area. A detection circuit includes an inductive proximity sensor to detect foreign objects that disturb power transmission in the charging area and to provide a signal indicating detection of a foreign object in the charging area. A vehicle controller includes control logic to command electrical power shut off to the charger based on the signal and to allow the charger to continue to charge the device during a period of time when the engine is temporarily turned off.

The system may further include an electrically conductive mat configured to be positioned in the charging area. The mat may include the inductive proximity sensor.

The inductive proximity sensor may be laid out in a pattern within a non-conductive or insulating substrate of the mat.

The charger may have a support surface wherein the mat may be a grounding mat which substantially completely covers the support surface.

The detection circuit may be a resonant circuit which is configured to detect a foreign object based on a behavior of the resonant circuit.

The inductive proximity sensor may comprise a substantially planar transformer.

The resonant circuit may have an electrical characteristic which changes when a foreign object is present in the charging area.

The controller may include $Q_i$ standard software.

The detection circuit may include an electronic switching device to shut off power to the sensor.

The switching device may comprise a solid state relay.

Further in carrying out the above objects and other objects of at least one embodiment of the present invention, a system for managing wireless inductive charging of mobile electronic devices within a passenger compartment of an automotive vehicle having engine stop/start capability is provided. The system includes a wireless inductive charger including a power transmitter coil configured to transmit power by inductive coupling and having a charging area for charging a mobile electronic device located in the charging area. A detection circuit includes an inductive proximity sensor to detect foreign objects that disturb power transmission in the charging area and to provide a signal indicating detection of a foreign object in the charging area. A vehicle controller includes control logic to command electrical power shut off to the charger based on the signal and to allow the charger to continue to charge the device during a period of time when the engine is temporarily turned off.

Still further in carrying out the above objects and other objects of at least one embodiment of the present invention, a mat for protecting a wireless inductive charger having a support surface and a charging area for charging a mobile electronic device located on the support surface in the charging area is provided. The mat includes a non-conductive or insulating substrate configured to substantially completely cover the support surface in the charging area and an inductive proximity sensor embedded in the substrate. The sensor includes a substantially planar transformer configured to develop a magnetic field in the charging area to detect a foreign object located in the charging area that interacts with the magnetic field.

The planar transformer may include a pair of coupled, interleaved coils.

The transformer may be a two-coil, planar, spiral transformer.

The planar transformer may include primary and secondary interleaved coils.

The substrate may be substantially rectangular wherein the planar transformer may be a rectangular planar transformer.

The substrate may be an elastomeric substrate such as a silicone rubber substrate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
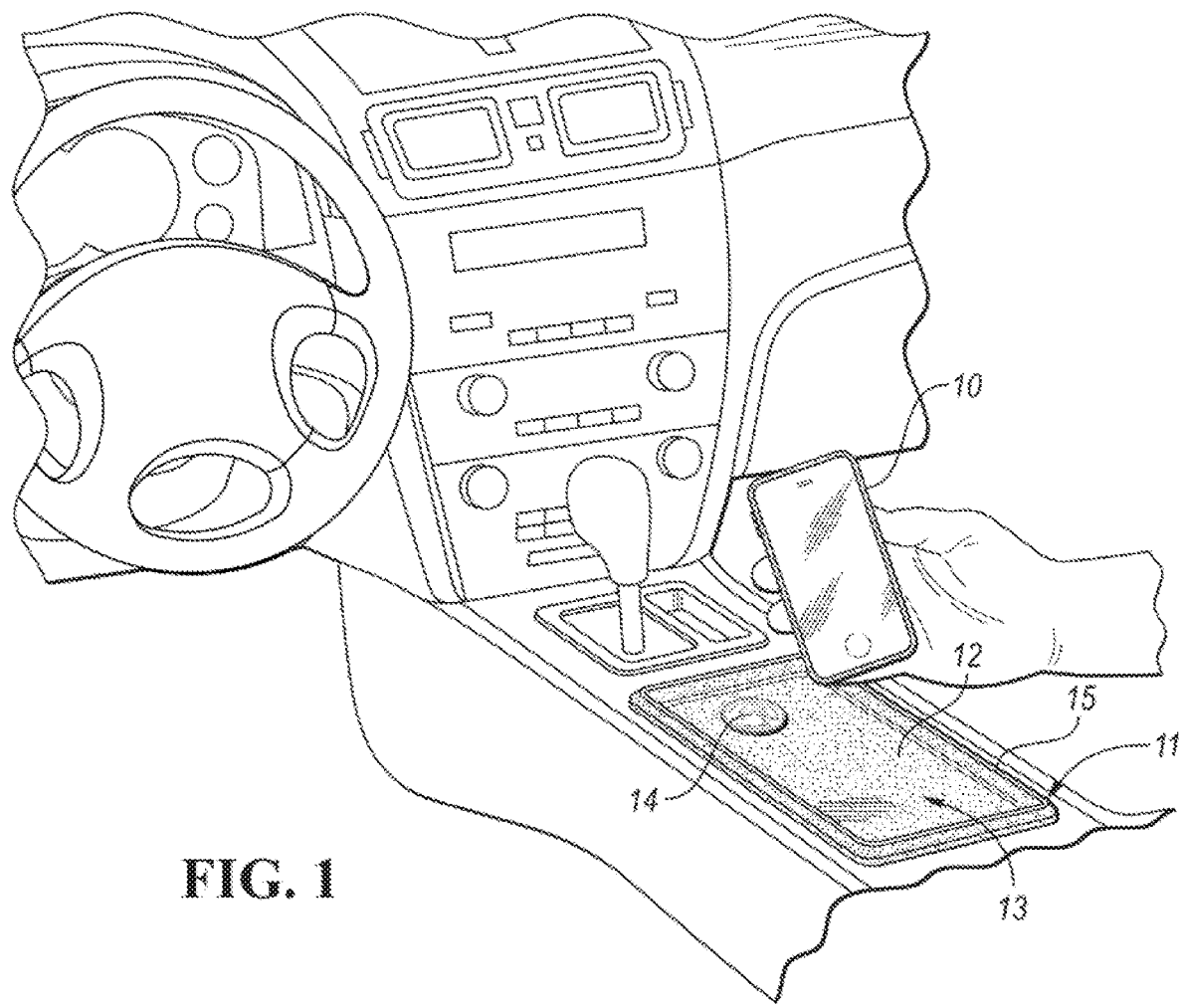
FIG. 1 is an environmental view, partially broken away, of an automotive vehicle interior including various components of a system for managing wireless inductive charging of a mobile phone shown therein wherein a foreign object such as a coin is shown supported on a protective mat.

Referring now to FIG. 1, a system for managing wireless inductive charging of mobile electronic devices such as a phone 10, and constructed in accordance with at least one embodiment of the present invention, is generally indicated at 11. The system 11 is shown within the interior of a vehicle such as an automobile. The system 10 includes an anti-vibration and anti-shock support surface of a substrate 12 of a protective mat, generally indicated at 13. A foreign object (i.e. not an authorized mobile electronic device) such as a coin 14, is shown supported on the support surface of the substrate 12. The mat 13 protects a wireless inductive charger, generally indicated at 20 in FIGS. 2 and 3. The charger 20 includes a power transmitter coil 21 embedded within an elastomeric pad (not shown) and transmitter electronics 22 capable of supplying electrical power to the electrically-powered device 10 when the device 10 is supported on an interface surface 27 of the pad and the vehicle is either at rest or in motion. An upwardly extending, outer peripheral wall portion 15 (only shown in FIG. 1) may be integrally formed with the pad.

Figure 2:
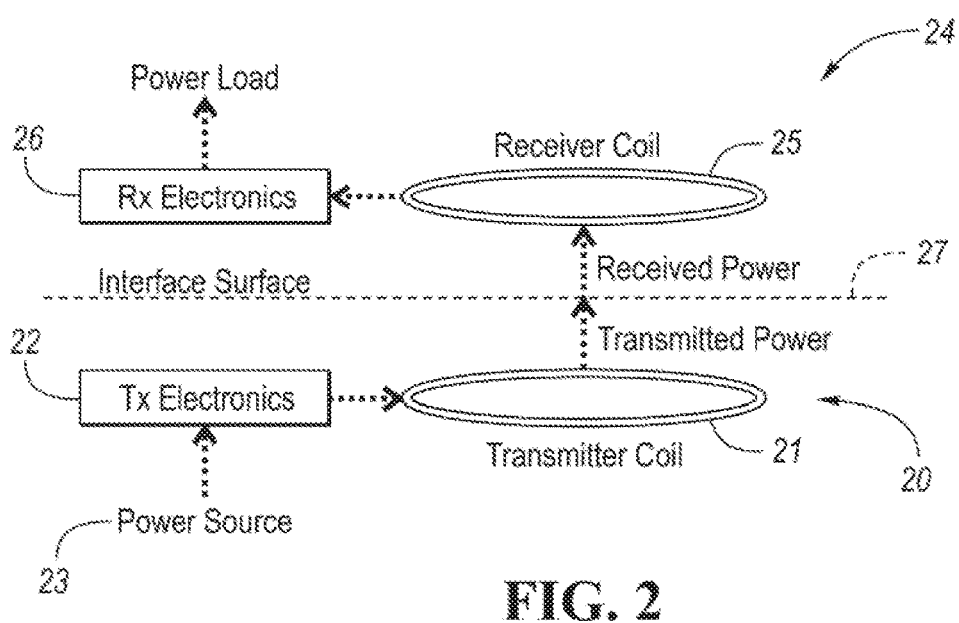
FIG. 2 is an illustration of a wireless inductive power transmission system.

FIG. 2 is an illustration of the wireless inductive charger 20, in the absence of foreign objects. In this example, the charger 20 is a transmitter subsystem which includes a power source 23 (such as a battery of the vehicle), the transmitter electronics 22, and the power transmitter coil 21. The phone 10 typically includes a receiver subsystem, generally indicated at 24, which includes a power receiver coil 25 and receiver electronics 26. The interface surface 24 of the pad separates the transmitter subsystem 20 from the receiver subsystem 24.

The power source 23 supplies the transmitter electronics 22 with power. The power can be alternating current (AC) or direct current (DC). Regardless, the transmitter electronics 22 conditions the power so that the power transmitter coil 21 receives an electrical current. The electrical current in the transmitter coil 21 produces an electromagnetic field. This electromagnetic field is represented by the "transmitted power" and the "received power" arrows in FIG. 2. This electromagnetic field is inductively coupled into the power receiver coil 25.

In this way, power is transferred across the interface surface 27 disposed between the power transmitter coil 21 and the power receiver coil 25. In some examples, the interface surface 27 is the interface between a housing or pad that encases the transmitter coil 21 and, optionally, another housing (i.e. of the device 10) that encases the receiver coil 25. Depending on the nature of the interface surface 27, the interface surface 27 can typically absorb or otherwise attenuate the transmitted power so that the transmitted power is greater than the received power. Regardless of the reason, the power that crosses the interface surface 27 and reaches the power receiver coil 25, as shown by the received power arrow in FIG. 2, can be less than the transmitted power. As is well known, foreign objects, such as the coin 14, located in the charging area of the power transmission path can disturb the power transfer.

Figure 3:
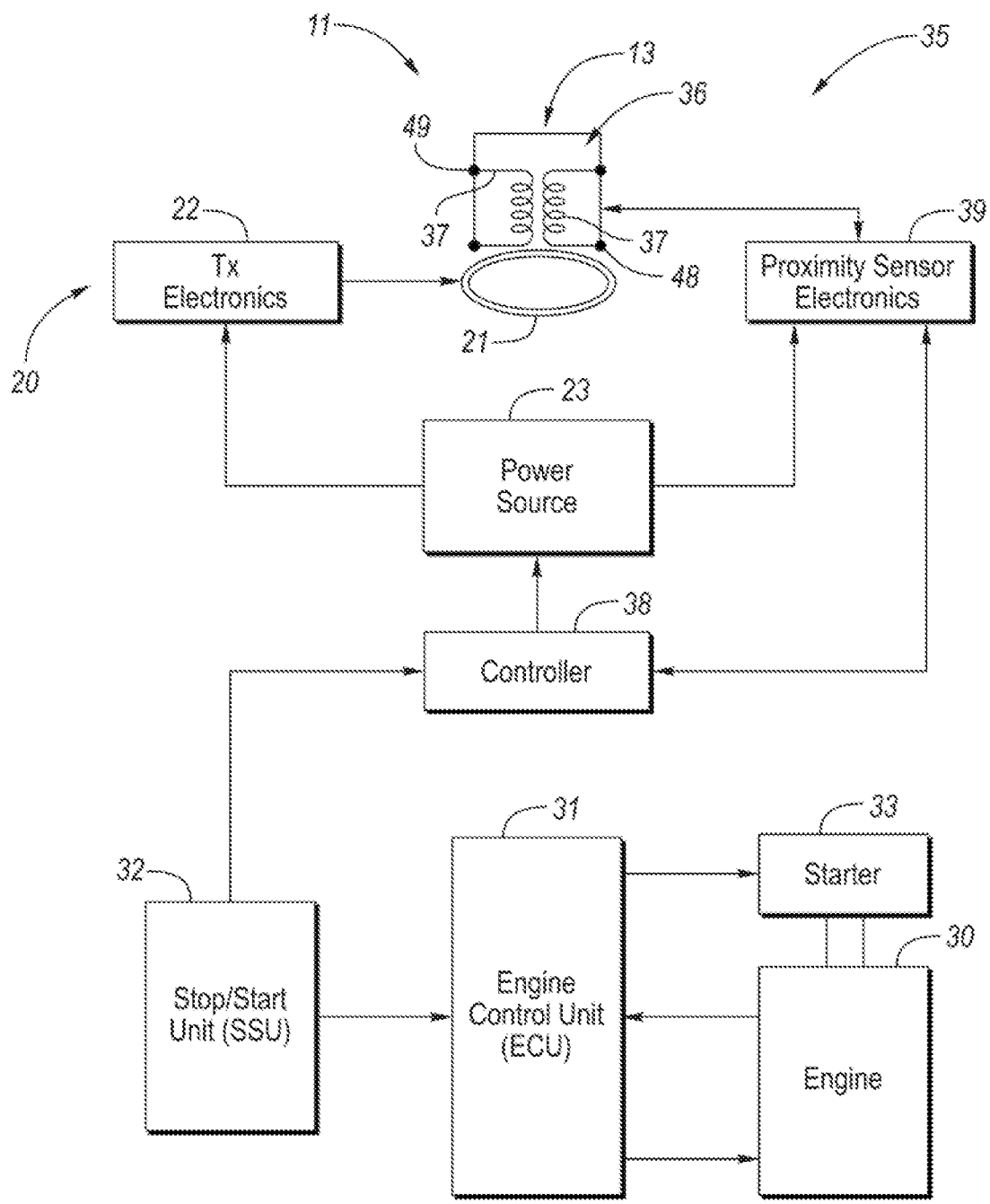
FIG. 3 is a schematic block diagram of a system for managing wireless inductive charging of mobile electronic devices within the interior of a vehicle having stop-start capability.
Figure 4:
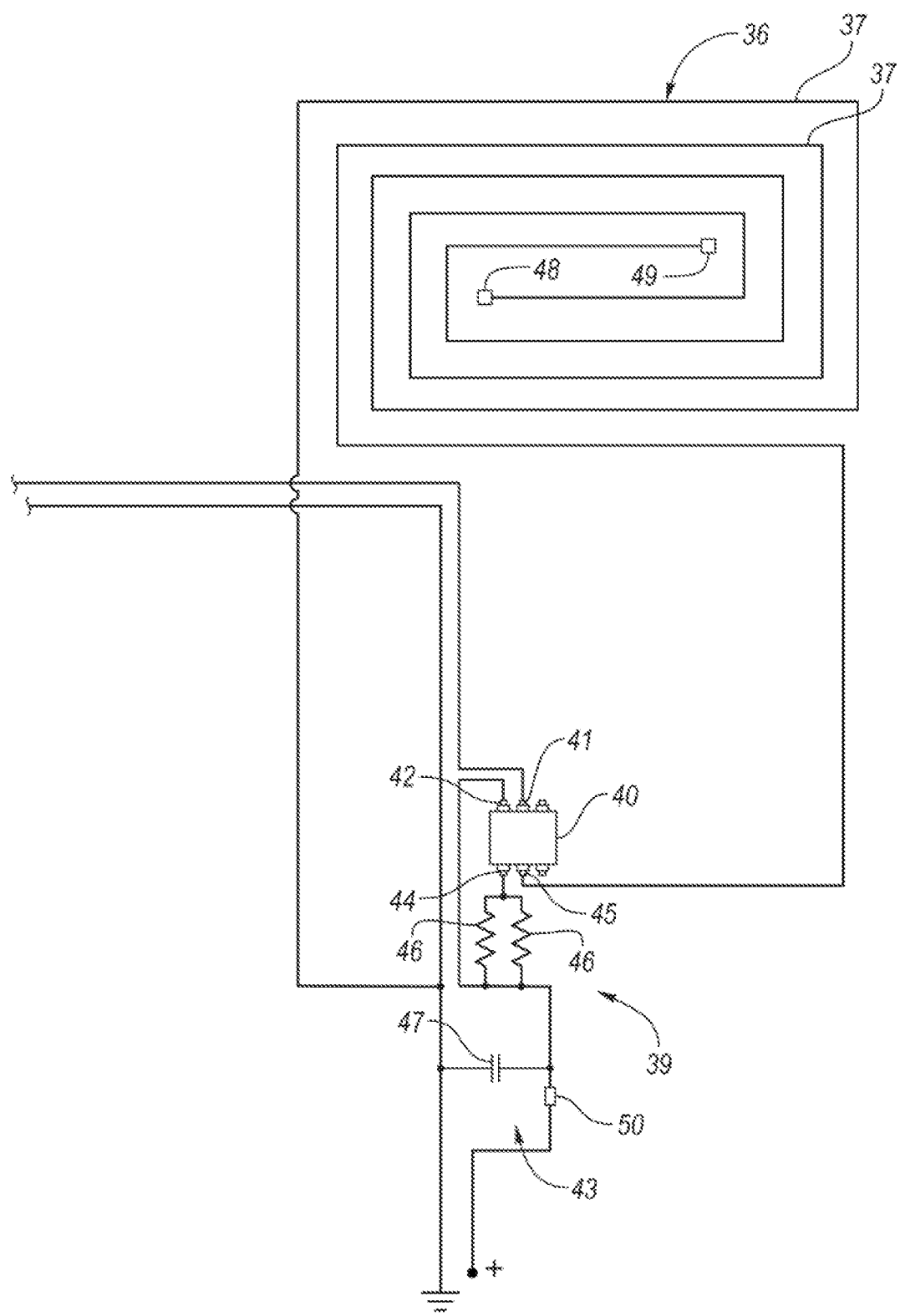
FIG. 4 is an electrical schematic diagram of various components of an inductive proximity sensor constructed in accordance with at least one embodiment of the present invention.

Referring now to FIG. 3, the system includes a detection circuit, generally indicated at 35, having an inductive proximity sensor, generally indicated at 36, that makes use of two coupled coils 37, which form a planar transformer. The two-coil spiral transformer 37 is a transducer which is embedded in the substrate 12. The two-coil transformer is shown in FIGS. 3 and 4. The relative phase difference of the current flowing in the primary and secondary windings or coils 37 of the planar transformer is typically feedback to a controller 38 via electrodes 48 and 49 and the electronics 39 to detect a foreign object. The controller 38 typically includes control logic in the form of a programmed microprocessor which looks at the phase difference to determine if power to the coil 21 should be turned off via the electronics 22. The invariance of the phase plot of the coils 37 with change in coil resistance (due to temperature change) is a feature for the operation of the inductive proximity sensor 36. The controller 38 is also typically programmed with $Q_i$ standard software.

Referring again to FIG. 3, a schematic representation of an engine system for operating the vehicle is shown. The engine system includes a driving engine 30, which is preferably an internal combustion engine. The driving engine 30 is controlled by an engine control unit 31 (i.e. ECU). For control of the engine 30, the engine control unit 31 receives sensor signals from sensors (not shown) situated in or on the internal combustion engine 30. The engine control unit 31, in turn, generates control signals for controlling the internal combustion engine 30.

The control of the internal combustion engine 30 takes place, as a rule, as a function of torque requests, such as a driver's torque command specified via an accelerator (not shown), and as a function of other torque requests, such as from an air-conditioning system (not shown) of the vehicle.

The engine system also includes a conventional engine start-stop functional unit (SSU) 32 which commands or instructs the engine control unit 31 to shut down the internal combustion engine 30, as required, or to start the internal combustion engine 30 again (via the ECU 31) with the aid of a starter 33. For this, the engine start-stop function implemented in the engine start-stop functional unit 32 provides both a switch-on signal and a shut-down signal for the engine control unit 31. The engine start-stop functional unit 32 may be developed in integrated fashion together with engine control unit 31 as is well known in the art.

The engine start-stop functional unit 32 stops the internal combustion engine 30 and restarts it again automatically, when certain vehicle states are present. The internal combustion engine 30 may, for instance, be stopped by the engine start-stop function of the engine start-stop functional unit 32, if a vehicle state is detected in which the vehicle is standing still, and it is to be expected that the standstill of the vehicle will exceed a minimum time. Furthermore, the engine start-stop functional unit 32 may instruct the engine control unit 31 to shut down the internal combustion engine 30, if the requested drive torque is to be provided completely by an additional driving motor, such as an electric motor (not shown). In addition, the engine start-stop function may provide switching "on" internal combustion engine 30 again (via the starter 33) if a drive torque is to be called for, for instance, when a driver of the vehicle operates the accelerator.

The SSU 32 also provides a signal to the controller 38 to shut off the charger when the engine 30 is temporarily turned "off". However, instead of immediately turning the charger "off" via the electronics 22, the controller 38 controls the power source 23 so that the power source 23 continues to power the electronics 22 during a predetermined period of time when the engine 30 is "off". The period of time can be a few minutes or a few hours depending on various device charging requirements.

Referring now to FIG. 4, the proximity sensor electronics 39 includes a solid-state relay (SSR) 40. The SSR 40 is an electronic switching device that switches "on" or "off" when a small external voltage is applied across its control terminals 41 and 42 typically via the controller 38. The SSR 40 typically consists of a sensor (i.e. an LED) which responds to an appropriate input control signal. The solid-state electronic switching device 40 switches power from the vehicle battery) across its output terminals 44 and 45 to load circuitry (i.e. the coils 37) which is driven by a resistance-capacitive network 43 of the electronics 39, and a coupling mechanism (within the SSR) to enable the control signal to activate the switch 40 without mechanical parts. The SSR 40 is designed to switch AC to the load (i.e. the coils 37 of the transformer). The SSR 40 serves the same function as an electromechanical relay, but has no moving parts.

The control terminal 42 is coupled to the output terminal 44 through a pair of parallel resistors 46 of the network 43 to provide feedback. The network 43 also includes a capacitor 47 which is charged by the DC power source 23 (i.e. vehicle battery). A fuse 50 of the network 43 prevents excessive current from flowing in the network 43.

The SSR 40 may include an in-channel MOSFET to switch the load (i.e. the transformer or sensor 36). The optical coupling within the SSR 40 allows the control circuit to be electrically isolated from the load (i.e. the transformer 36).

In summary, a system for managing wireless inductive charging of mobile electronic devices within the interior of a vehicle having engine stop/start capability is provided. The system includes a wireless inductive charger including a power transmitter coil configured to transmit power by inductive coupling and having a charging area for charging a mobile electronic device located in the charging area.

The system includes a detection circuit having an inductive proximity sensor to detect foreign objects that disturb power transmission in the charging area and to provide a signal indicating detection of a foreign object in the charging area.

The system further includes a vehicle controller having control logic to command electrical power shut off to the charger based on the signal and to allow the charger to continue to charge the device during a period of time when the engine is temporarily turned off.

The system typically comprises an electrically conductive mat configured to be positioned in the charging area. The mat includes the inductive proximity sensor.

The sensor typically is laid out in a pattern within a non-conductive or insulating substrate of the mat.

The charger typically has a charging surface wherein the mat is a grounding mat which substantially completely covers the charging surface.

The detection circuit typically includes a resonant circuit which is configured to detect a foreign object based on a behavior of the resonant circuit.

The sensor typically includes a substantially planar transformer.

The resonant circuit typically has an electrical characteristic which changes when a foreign object is present in the charging area.

The controller typically includes $Q_i$ standard software.

The detection circuit typically includes an electronic switching device to shut off power to the sensor. The switching device may comprise a solid-state relay.

Also, in summary, the mat, which protects the wireless inductive charger, has a support surface and a charging area for charging a mobile electronic device located on the support surface in the charging area. The mat includes a non-conductive or insulating substrate configured to completely cover the support surface in the charging area. The mat also includes an inductive proximity sensor embedded in the substrate. The sensor includes a substantially planar transformer configured to develop a magnetic field in the charging area to detect a foreign object located in the charging area that interacts with the magnetic field.

The planar transformer may include a pair of coupled interleaved coils. The transformer may be a two-coil, planar, spiral transformer. The planar transformer may include primary and secondary interleaved coils.

The substrate may be substantially rectangular wherein the planar transformer may be a rectangular planar transformer.

The substrate may be an elastomeric substrate. The elastomeric substrate may be a silicone rubber substrate. The elastomer may be a thermoplastic elastomer.

Thermoplastic elastomers (TPEs) (such as for the pad of the charger 20 and the substrate 12 of the mat 13) are a class of polymers that behave like thermoset rubber but that, above their melt or softening temperatures, are melt processable via thermoplastic processing methods and can be easily reprocessed and remolded. The ability to process these materials with thermoplastic methods allows for design and fabrication freedom.

Bondable thermoplastic elastomer compounds may be formulated to provide a chemical bond to plastic substrates, such as TPE substrates, making possible simpler part designs that are less dependent on mechanical interlocks or require time consuming surface preparation during production.

These compounds are compatible with insert or multi-shot molding methods and are ideal for applications where a "soft-touch" feature can provide an ergonomic touch or enhance consumer appeal, dampen sound or vibration, or provide impact or shock protection. Also, such compounds are elastic.

A thermoplastic elastomer (TPE) of at least one embodiment of the present invention may be selected from the group consisting of a thermoplastic polyolefin, thermoplastic urethane, polyester, polycarbonate, acrylonitrile/butadiene/stylene ("ABS"), polypropylene, lomod, bexloy, mixture of acrylonitrile/butadiene/styrene (i.e. ABS) and polycarbonate, and mixtures thereof.

Aspects of this disclosure may be implemented, in some embodiments, through a computer-executable program of instructions, such as program modules, generally referred to as software applications or application programs, executed by an onboard vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, microcomputers, mainframe computers, and the like. In addition, aspects of the present disclosure may be practiced in distributed-computing environments when tasks are performed by remote-processing devices that are linked through a communication network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosure herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described, persons of ordinary skill in the art will readily appreciate that many other methods of implementing the example machine readable instructions may alternatively be used.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for managing wireless inductive charging of mobile electronic devices within the interior of a vehicle having engine stop/start capability, the system comprising:
a wireless inductive charger including a power transmitter coil configured to transmit power by inductive coupling and having a charging area for charging a mobile electronic device located in the charging area;
a detection circuit including an inductive proximity sensor to detect foreign objects that disturb power transmission in the charging area and to provide a signal indicating detection of a foreign object in the charging area; and
a vehicle controller configured to receive a signal from an engine start-stop functional unit (SSU), the vehicle controller including control logic to command electrical power shut off to the charger based on the signals and to allow the charger to continue to charge the device during a period of time when the engine is temporarily turned off.

2. The system as claimed in claim 1, further comprising an electrically conductive mat configured to be positioned in the charging area, the mat including the inductive proximity sensor.

3. The system as claimed in claim 2, wherein the sensor is laid out in a pattern within a non-conductive or insulating substrate of the mat.

4. The system as claimed in claim 3, wherein the charger has a support surface and wherein the mat is a grounding mat which substantially completely covers the support surface.

5. The system as claimed as claim 1, wherein the detection circuit is a resonant circuit which is configured to detect a foreign object based on a behavior of the resonant circuit.

6. The system as claimed in claim 1, wherein the inductive proximity sensor comprises a substantially planar transformer.

7. The system as claimed in claim 5, wherein the resonant circuit has an electrical characteristic which changes when a foreign object is present in the charging area.

8. The system as claimed in claim 1, wherein the controller includes $Q_i$ standard software.

9. The system as claimed in claim 1, wherein the detection circuit includes an electronic switching device to shut off power to the sensor.

10. The system as claimed in claim 9, wherein the switching device comprises a solid state relay.

11. A system for managing wireless inductive charging of mobile electronic devices within a passenger compartment of an automotive vehicle having engine stop/start capability, the system comprising:
a wireless inductive charger including a power transmitter coil configured to transmit power by inductive coupling and having a charging area for charging a mobile electronic device located in the charging area;
a detection circuit including an inductive proximity sensor to detect foreign objects that disturb power transmission in the charging area and to provide a signal indicating detection of a foreign object in the charging area; and
a vehicle controller configured to receive a signal from an engine start-stop functional unit (SSU), the vehicle controller including control logic to command electrical power shut off to the charger based on the signals and to allow the charger to continue to charge the device during a period of time when the engine is temporarily turned off.

12. The system as claimed in claim 11, further comprising an electrically conductive mat configured to be positioned in the charging area, the mat including the inductive proximity sensor.

13. The system as claimed in claim 12, wherein the sensor is laid out in a pattern within a non-conductive or insulating substrate of the mat.

14. The system as claimed in claim 13, wherein the charger has a support surface and wherein the mat is a grounding mat which substantially completely covers the support surface.

15. The system as claimed as claim 11, wherein the detection circuit is a resonant circuit which is configured to detect a foreign object based on behavior of the resonant circuit.

16. The system as claimed in claim 11, wherein the inductive proximity sensor comprises a substantially planar transformer.

17. The system as claimed in claim 15, wherein the resonant circuit has an electrical characteristic which changes when a foreign object is present in the charging area.

18. The system as claimed in claim 11, wherein the controller includes $Q_i$ standard software.

19. The system as claimed in claim 11, wherein the detection circuit includes an electronic switching device to shut off power to the sensor.

20. The system as claimed in claim 19, wherein the switching device comprises a solid state relay.

21. A mat for protecting a wireless inductive charger having a support surface and a charging area for charging a mobile electronic device located on the support surface in the charging area, the mat comprising:
a non-conductive or insulating substrate configured to substantially completely cover the support surface in the charging area; and
an inductive proximity sensor embedded in the substrate and including a substantially planar transformer configured to develop a magnetic field in the charging area to detect a foreign object located in the charging area that interacts with the magnetic field.

22. The mat as claimed in claim 21, wherein the planar transformer includes a pair of coupled interleaved coils.

23. The mat as claimed in claim 21, wherein the transformer is a two-coil, planar, spiral transformer.

24. The mat as claimed in claim 21, wherein the planar transformer includes primary and secondary interleaved coils.

25. The mat as claimed in claim 21, wherein the substrate is substantially rectangular and wherein the planar transformer is a rectangular planar transformer.

26. The mat as claimed in claim 21, wherein the substrate is an elastomeric substrate.

27. The mat as claimed in claim 26, wherein the elastomeric substrate is a silicone rubber substrate.

* * * * *